Figure 1:
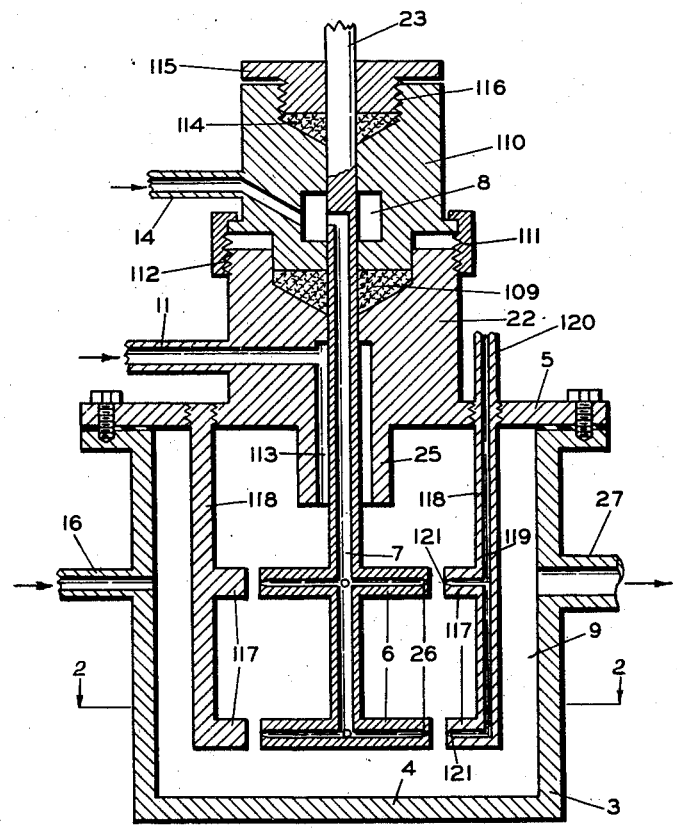

Jan. 8, 1946.   M. P. MATUSZAK   2,392,542
APPARATUS FOR MIXING FLUIDS
Original Filed Oct. 5, 1942

INVENTOR
M. P. MATUSZAK
BY Hudson, Young & Yinger
ATTORNEYS

Patented Jan. 8, 1946

2,392,542

UNITED STATES PATENT OFFICE 2,392,542

APPARATUS FOR MIXING FLUIDS

Maryan P. Matuszak, Bartlesville, Okla., assignor to Phillips Petroleum Company, a corporation of Delaware Original application October 5, 1942, Serial No. 460,843. Divided and this application July 15, 1943, Serial No. 494,868

6 Claims. (Cl. 259—7)

This invention relates to improvements in apparatus for mixing fluids, more particularly to improved apparatus for conducting chemical processes involving adding continuously at least one fluid to a zone wherein it is rapidly mixed with the contents already present in the zone, and still more particularly to improvements in apparatus for conducting a chemical process such as an alkylation process involving introducing one or more fluid reactants to a reaction mixture under reaction conditions.

In many processes, mixing of fluids is desirable or necessary. When the fluids are mutually chemically inert during the mixing, so that the product is merely a physical mixture or emulsion of the original fluids without these fluids being changed chemically, the precise manner of bringing the fluids together may be relatively unimportant; that is, provided that the final proportions of the fluids are within certain limits, the nature and composition of the product may be relatively independent of such factors as the order of bringing the fluids together, the rate of mixing, and the like. When, however, the fluids are mutually chemically reactive, and especially when one or more of them can undergo more than one chemical reaction, the precise manner of mixing may be very important in determining the nature and composition of the product.

Although certain aspects of the present invention may be applied to the mixing of any fluids whatsoever, some of its aspects are particularly advantageous for mixing liquids that undergo chemical reaction, especially a chemical reaction that competes with one or more other reactions and that proceeds most desirably if the concentration of one reactant is kept as low as possible. The invention may be applied to reactions conducted in a batch-wise manner, but it is most useful when applied to reactions conducted in a continuous manner.

An object of this invention is to provide an improved apparatus for mixing fluids.

A specific object of this invention is to provide improved means for mixing mutually chemically reactive fluid reactants under reaction conditions in such manner that the relative concentration of a selected reactant is minimal.

Another specific object of this invention is to provide improved means for rapidly dispersing a first liquid reactant in a reaction zone containing a second liquid reactant, whereby a desired reaction between the two reactants is favored, and one or more competitive reactions consuming the first liquid reactant are minimized.

Another specific object of this invention is to provide improved means for conducting the alkylation of an alkylatable hydrocarbon with an alkylating agent or alkylant in a zone in which suitable conditions are maintained for the alkylation in the presence of a mobile alkylation catalyst, whereby the alkylation is favored, and competitive reactions are minimized.

Another specific object of this invention is to provide improved means for the production of alkylated compounds.

Another specific object of this invention is to provide means for effecting cooling of an alkylation reaction mixture while at the same time recovering in purified condition at least part of a volatile alkylation catalyst contained in the alkylation reaction mixture.

Other objects and advantages of this invention will be apparent to those skilled in the art from the following description, the accompanying drawing, and the appended claims.

In one specific embodiment, this invention comprises means whereby at least one of two or more fluids is introduced into a mixing zone through one or more openings that are in continuous motion with respect to the mobile contents of the zone, the openings being preferably so located in moving devices for imparting vigorous turbulent and/or circulatory motion to the contents of the zone that relative movement of the contents of the zone past the openings occurs at relatively high velocity. Examples of such moving devices are impellers, propellers, other mechanical agitators of various types, and the like. If desired, a part of the total fluid being introduced into the mixing zone may be introduced through openings in selected stationary spots at which movement of the contents of the zone past the openings occurs at relatively high velocity; such openings may be in, for example, guiding and/or turbulence-aiding partitions, fins, baffles, other protuberances of various types, and the like. For removal of heat from the resulting mixture, evaporative cooling may be practiced.

Figure 2:
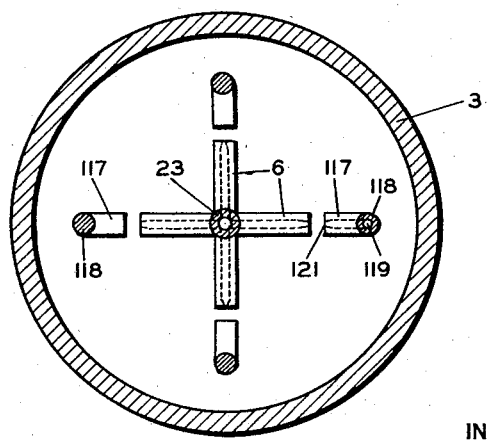

Understanding of this invention may be facilitated by reference to the accompanying drawing, in which, Fig. 1 is a diagrammatic section of one illustrative form of mixer or reactor embodying certain specific aspects of the invention, and Fig. 2 is a sectional view on the line 2—2 of Fig. 1.

In Fig. 1 is shown a vertical diagrammatic section of one form of mixer or agitator constructed in accordance with the present invention. It will be understood that Fig. 1 does not purport to show the most desirable dimensions and/or proportions, but that it has been drawn with certain parts out of proportion in order to depict clearly certain advantageous features. Hence, proportions departing widely from those of Fig. 1 may be used without passing beyond the scope of these particular aspects of the invention; similarly, parts made or arranged quite differently from those shown in Fig. 1 may be used, provided only that they perform substantially the same functions as those specifically shown or described herein.

The reactor illustrated in Figs. 1 and 2 is a generally cylindrical shell 3 closed at one end by bottom 4 and at the other end by detachable cover 5, which may be attached to shell 3 by any suitable means, as by a flange-type joint with suitable clamps or bolts. Shell 3 is provided with any desired number of inlets and outlets, exemplified by inlet 16 and outlet 27.

Cover 5 has incorporated with it packing gland or stuffing box 22 around rotatable shaft 23, which is provided with one or more sets of stirrer, impeller, or propeller vanes or blades 6, designed or shaped so as not only to agitate the contents of shell 3 but also to cause internal recirculation. Shaft 23 has an internal passageway 7, which communicates on the one hand through space 8 with inlet 14 and on the other hand through one or more orifices 26 with mixing and/or reaction zone 9 defined by shell 3, bottom 4, and cover 5; passageway 7 is advantageously used for the introduction of a reactant the concentration of which is desired to be minimal in zone 9. Orifices 26 may be constructed in any way that aids in the rapid dispersal of material passing through them into zone 9; usually they are preferably much smaller in diameter than passageway 7 and are further preferably of a jet-like construction. They are preferably located at the points in stirrer blades 6 at which maximal contact with the mixture in zone 9 per unit time is effected, but they may be located otherwise than as specifically shown.

Leakage around shaft 23 below space 8 is prevented by packing 109, suitably graphited asbestos or the like, housed in the upper part of gland 22. This packing may be compressed to any desired extent by compression member 110, which cooperates with gland 22 through a tightening means exemplified by rotatable annular ring 111 cooperating with gland 22 as by threads 112. Packing 109 is advantageously protected from the mixture in zone 9 by the sweeping passage of material relatively inert to the packing, such as an alkylatable hydrocarbon, from inlet 11 through annular space 113 between shaft 23 and apron 25 into zone 9. Leakage around shaft 23 above space 8 is similarly prevented by packing 114, housed in the upper end of compression member 110, which at this point is similar in function to the upper part of gland 22. This packing may be tightened or compressed to any desired extent by tightening member 115, which cooperates with the upper part of member 110, as through screw threads 116, in a manner well understood in the art. It will be understood that the arrangement shown in Figure 1 is schematic and that various known modifications, such as for example the use of lantern glands and of forced lubrication of shaft 23 at points in contact with packings 109 and 114, may be practiced whenever advantageous or convenient.

Cooperating in the mixing function of rotating vanes or blades 6 may be one or more sets of stationary vanes 117, angularly spaced and corresponding in number and vertical spacing to blades 6, supported as from cover 5 by supporting members 118 which are shown as rod-like in form but which may be an annular member. One of members 118 is shown as being provided with passageway 119 for introduction of one or more reactants, or of the catalyst, from inlet 120 through orifices or jets 121 in vanes 117 into zone 9, in the manner already indicated. The orifices 121 may desirably be substantially smaller in diameter than passageway 119, as before. If part or all of an olefin or other alkylant is introduced into zone 9 through orifices 121, the catalyst should be introduced through some other inlet, such as inlet 16.

As an example of the alkylation of a relatively readily alkylatable hydrocarbon may be taken the continuous alkylation of benzene with olefins in the presence of concentrated or anhydrous hydrofluoric acid. The hydrofluoric acid is introduced, as through inlet 16, into the alkylator, which is preferably provided with a single or multiple agitating unit of the turbo-mixer type; after a steady state of operation is reached, only make-up acid to replace lost acid and acid withdrawn from the system is added through inlet 16.

Benzene is added, as through inlet 11, to the alkylator in a manner designed to protect the packing around the rotating shaft of the turbo-mixer unit, passing from this packing toward the interior of the alkylator as within apron 25. Most of the benzene going to the alkylator, however, is passed in admixture with the alkylating olefin via inlet 14 through the passageway 7 in shaft 23 of the agitating unit and into the reaction zone through jet-type openings 26 at points in the unit having relatively high linear velocities, as at the extremities of the blades of this unit. Thereby an extraordinarily rapid dispersal and mixing of the incoming feed with the already present and internally recirculating mixture of hydrocarbons and hydrofluoric acid is obtained, with a resultant extraordinarily high alkylation efficiency, so that the consumption of olefin by reactions other than alkylation is negligible or virtually nil. One component of the reaction mixture may be introduced via inlet 120 and jet orifices 121 if desired. The reaction mixture may be withdrawn through outlet 27.

Because the invention may be practiced otherwise than as specifically shown herein, and because many variations and modifications of it will be obvious to those skilled in the art, the invention should not be restricted except as specifically indicated in the appended claims.

This application is a division of my prior and copending application Serial No. 460,843, filed October 5, 1942, which matured into Patent No. 2,379,368, on June 26, 1945.

I claim:

1. Apparatus for carrying out a chemical reaction involving a plurality of fluids and for intimately mixing said fluids during said reaction comprising stationary enclosing means forming a closed relatively large mixing and reaction zone and comprising a container and a cover therefor, inlet means connected to said stationary means for introducing a reactant continuously thereto, outlet means connected to said stationary means for continuously withdrawing reaction products therefrom, a rotatable stirrer shaft extending downwardly through said cover into said container, a plurality of vertically spaced outwardly extending mixing blades rigidly mounted on said shaft within said container, a passageway in said shaft extending from an inlet point at the surface thereof located above said cover axially downwardly and then outwardly through said mixing blades to the ends thereof, a member surrounding said shaft and forming an annular space surrounding said inlet point, an inlet conduit connected to said member and to said annular space, sealing means located above said inlet point and said annular space for sealing said shaft with respect to said annular space, common sealing means below said inlet point and said annular space for sealing said shaft with respect to said annular space and also for sealing said shaft with respect to said cover, and a plurality of vertically spaced stationary horizontal vanes supported by said cover, said vanes corresponding in number and vertical position to said mixing blades and located just outwardly of the tips of said mixing blades, said vanes being angularly spaced in their annular relationship to said mixing blades.

2. Apparatus for carrying out a chemical reaction involving a plurality of fluids and for intimately mixing said fluids during said reaction comprising stationary enclosing means forming a closed relatively large mixing and reaction zone and comprising a container and a cover therefor, inlet means connected to said stationary means for introducing a reactant continuously thereto, outlet means connected to said stationary means for continuously withdrawing reaction products therefrom, a rotatable stirrer shaft extending downwardly through said cover into said container, a plurality of vertically spaced outwardly extending mixing blades rigidly mounted on said shaft within said container, a passageway in said shaft extending from an inlet point at the surface thereof located above said cover axially downwardly and then outwardly through said mixing blades to the ends thereof, a member surrounding said shaft and forming an annular space surrounding said inlet point, an inlet conduit connected to said member and to said annular space, sealing means located above said inlet point and said annular space for sealing said shaft with respect to said annular space, common sealing means below said inlet point and said annular space for sealing said shaft with respect to said annular space and also for sealing said shaft with respect to said cover, a plurality of vertically spaced stationary horizontal vanes corresponding in number and vertical position to said mixing blades and located just outwardly of the tips of said mixing blades, said vanes being angularly spaced in their annular positioning around said mixing blades, a plurality of vertical supporting means depending from said cover for supporting said vanes, a vertical passageway in at least one of said supporting means leading from said cover axially downwardly of said supporting means and then inwardly through said vanes supported thereby to the inward tips of said vanes and discharging oppositely to the passageway in said blades, and an inlet conduit connected to said vertical passageway for supplying a reactant into said reaction zone.

3. Apparatus for carrying out a chemical reaction involving a plurality of fluids and for intimately mixing said fluids during said reaction comprising stationary enclosing means forming a closed relatively large mixing and reaction zone and comprising a container and a cover therefor, inlet means connected to said stationary means for introducing a reactant continuously thereto, outlet means connected to said stationary means for continuously withdrawing reaction products therefrom, a rotatable stirrer shaft extending downwardly through said cover into said container, a plurality of vertically spaced outwardly extending mixing blades rigidly mounted on said shaft within said container, a passageway in said shaft extending from an inlet point at the surface thereof located above said cover axially downwardly and then outwardly through said mixing blades to the ends thereof, a member surrounding said shaft and forming an annular space surrounding said inlet point, an inlet conduit connected to said member and to said annular space, sealing means located above said inlet point and said annular space for sealing said shaft with respect to said annular space, common sealing means below said inlet point and said annular space for sealing said shaft with respect to said annular space and also for sealing said shaft with respect to said cover, a plurality of vertically spaced stationary horizontal vanes corresponding in number and vertical position to said mixing blades and located just outwardly of the tips of said mixing blades, said vanes being angularly spaced in their annular positioning around said mixing blades, a plurality of vertical supporting means depending from said cover for supporting said vanes, a vertical passageway in at least one of said supporting means leading from said cover axially downwardly of said supporting means and then inwardly through said vanes supported thereby to the inward tips of said vanes and discharging oppositely to the passageways in said blades, the orifices in both said blades and said vanes being substantially smaller than the passageways feeding the same and being constricted in such a way as to aid in more rapid dispersal of the material passing through them into the reaction mixture in said reaction zone.

4. Apparatus for carrying out a chemical reaction involving a plurality of fluids and for intimately mixing said fluids during said reaction comprising stationary enclosing means forming a closed relatively large mixing and reaction zone and comprising a container and a cover therefor, inlet means connected to said stationary means for introducing a reactant continuously thereto, outlet means connected to said stationary means for continuously withdrawing reaction products therefrom, a rotatable stirrer shaft extending downwardly through said cover into said container, a plurality of vertically spaced outwardly extending mixing blades rigidly mounted on said shaft within said container, a passageway in said shaft extending from an inlet point at the surface thereof located above said cover axially downwardly and then outwardly through said mixing blades to the ends thereof, a member surrounding said shaft and forming an annular space surrounding said inlet point, an inlet conduit connected to said member and to said annular space, sealing means located above said inlet point and said annular space for sealing said shaft with respect to said annular space, common sealing means below said inlet point and said annular space for sealing said shaft with respect to said annular space and also for sealing said shaft with respect to said cover, means associated with said cover and forming a second annular space which surrounds said shaft and is in free communication with the interior of said container, said common sealing means preventing fluid from passing upwardly along said shaft from said second annular space, and an inlet conduit connected to said second annular space for supplying an inert fluid thereto and thence into said reaction zone thereby preventing the mixture in said container from contacting said common sealing means.

5. Apparatus for carrying out a chemical reaction involving a plurality of fluids and for intimately mixing said fluids during said reaction comprising stationary enclosing means forming a closed relatively large mixing and reaction zone, inlet means connected to said stationary means for introducing a reactant continuously thereto, outlet means connected to said stationary means for continuously withdrawing reaction products therefrom, a rotatable stirrer shaft extending through said enclosing means into said zone, outwardly extending mixing blades carried on said shaft within said zone, a passageway in said shaft extending from an inlet point at the surface thereof located outside said enclosing means axially along said shaft and then outwardly through said mixing blades to the ends thereof, a member surrounding said shaft and forming an annular space surrounding said inlet point, an inlet conduit connected to said member and to said annular space, sealing means located outside said inlet point and said annular space for sealing said shaft with respect to said annular space, common sealing means inside said inlet point and said annular space for sealing said shaft with respect to said annular space and also for sealing said shaft with respect to said enclosing means, and stationary horizontal vanes supported by said enclosing means, said vanes corresponding in number and axial position to said mixing blades and being located just outwardly of the tips of said mixing blades, said vanes being angularly spaced in their annular relationship to said mixing blades.

6. Apparatus for carrying out a chemical reaction involving a plurality of fluids and for intimately mixing said fluids during said reaction comprising stationary enclosing means forming a closed relatively large mixing and reaction zone, inlet means connected to said stationary means for continuously introducing thereto a fluid which participates in said reaction, outlet means connected to said stationary means for continuously withdrawing reaction products therefrom, a rotatable stirrer shaft extending through said enclosing means into said zone, outwardly extending mixing blades carried by said shaft within said zone for imparting turbulent and circulatory motion to the reaction mixture therein, a passageway in said shaft extending from an inlet point at the surface thereof located outside said enclosing means axially along said shaft and then outwardly through said mixing blades to the ends thereof, a member surrounding said shaft and forming an annular space surrounding said inlet point, an inlet conduit connected to said member and to said annular space, sealing means located outside said inlet point and said annular space for sealing said shaft with respect to said annular space, common sealing means inside said inlet point and said annular space for sealing said shaft with respect to said annular space and also for sealing said shaft with respect to said enclosing means, means associated with said enclosing means and forming a second annular space which surrounds said shaft and is in free communication with said zone, said common sealing means preventing fluid from passing upwardly along said shaft from said second annular space, and an inlet conduit connected to said second annular space for supplying an inert fluid thereto and thence into said reaction zone thereby preventing the mixture in said zone from contacting said common sealing means.

MARYAN P. MATUSZAK.